F. F. BRUCKER.
HALF SOLE FOR PNEUMATIC TIRES.
APPLICATION FILED MAR. 30, 1920.

1,398,414.

Patented Nov. 29, 1921.

Inventor:
Ferdinand F. Brucker,
Spear, Middleton, Donaldson & Spear
Attorneys

UNITED STATES PATENT OFFICE.

FERDINAND FRANCIS BRUCKER, OF AKRON, OHIO, ASSIGNOR TO THE MILLER RUBBER COMPANY, OF AKRON, OHIO, A CORPORATION OF OHIO.

HALF-SOLE FOR PNEUMATIC TIRES.

1,398,414.

Specification of Letters Patent.  Patented Nov. 29, 1921.

Application filed March 30, 1920. Serial No. 369,984.

*To all whom it may concern:*

Be it known that I, FERDINAND F. BRUCKER, a citizen of the United States, and a resident of the city of Akron, county of Summit, State of Ohio, have invented certain new and useful Improvements in Half-Soles for Pneumatic Tires, of which the following is a specification.

My invention relates to half-soles for pneumatic tires and one object is to provide such a construction of the half-sole as will facilitate the correct placing or combining of the half-sole with the tire without the use of a fuller tool. The invention consists in the features hereinafter described and particularly pointed out in the claims.

Figure 1:
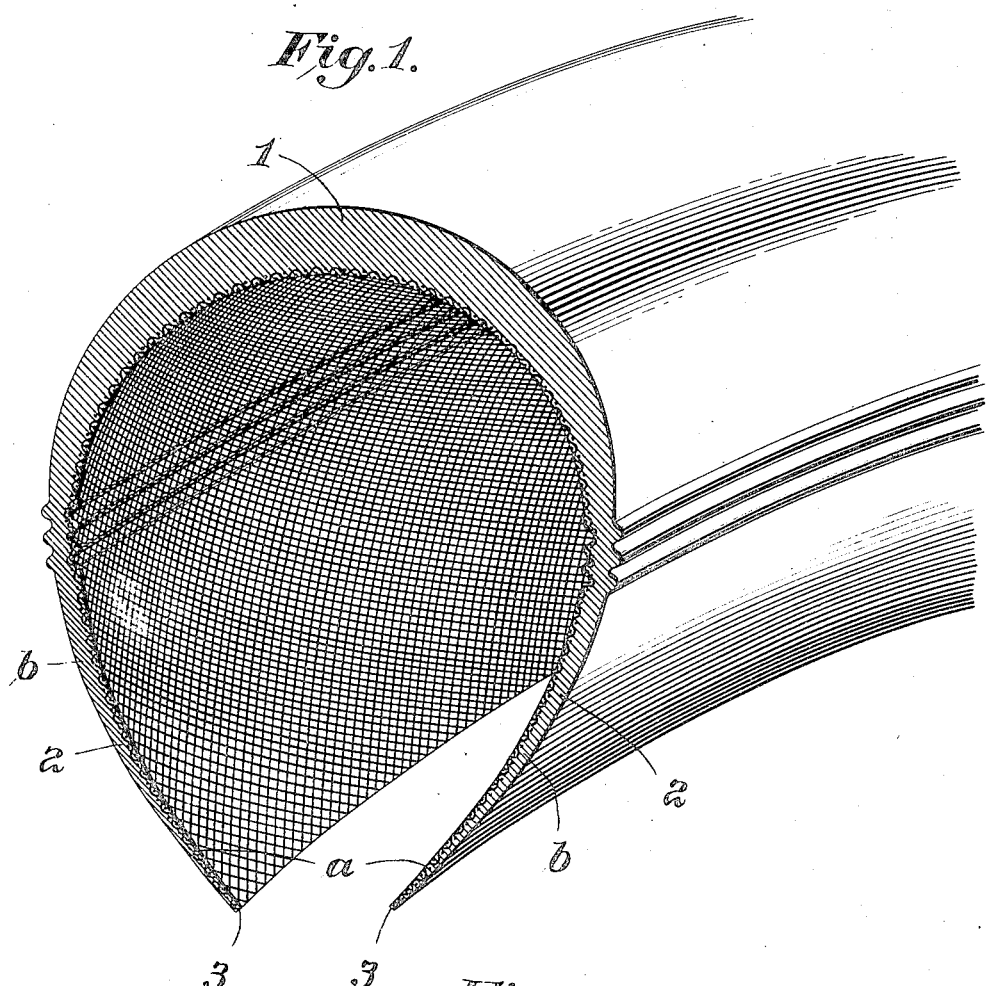
Figure 1 represents in perspective view a half-sole embodying my invention.
Figure 2:
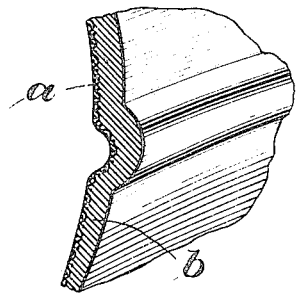
Fig. 2 represents a portion of the half-sole to illustrate a modified form of the invention.

As shown in the accompanying drawings, my tire casing section, which is sometimes called a "half-sole," includes the usual relatively thick tread portion 1 and the side walls 2 which taper toward the circumferential edges 3 which when the section is applied to a tire carcass may terminate back of the beads or may be constructed to extend around the beads. This casing section is usually built up of a fabric foundation $a$ and a rubber compound covering $b$ of appropriate thickness, and usually, when the section is sold to the trade, it is completely cured or vulcanized.

These sections or half soles are most commonly used for repairing worn tire casings and, in the usual procedure, the tread of the worn casing is removed and the old carcass suitably buffed (or the worn tread is buffed) and coated with cement. The inner surface of the half sole is likewise coated with cement and while the cement is in a slippery condition, the half sole is stretched over the old carcass worn tread, and stitched or rolled down, then an inner tube is inserted in the carcass, the latter applied to a rim, and the inner tube inflated as when the tire is in use, and in some instances the half sole is then further rolled down or stitched down.

In many cases, in initially applying the half sole, circumferentially extending sections on each side thereof are held out of contact with the old carcass for the purpose of permitting the latter to expand relative to the half sole when the inner tube is inflated.

My invention contemplates the incorporation in the half sole of means for preventing the adhesion of portions thereof to the carcass during the initial application of the half sole and for permitting the expansion of the carcass relative to the half sole when the inner tube aforesaid is inflated, and in the illustrated exemplification of my invention, this is obtained by providing one or more outwardly projecting circumferentially running corrugations in the side portions of the half sole. Thus, when the half sole is initially applied to the carcass, the inner wall of each corrugation is spaced apart from the adjacent portion of the periphery of the carcass so that adhesion between the opposing parts does not take place, and when the inner tube is inflated, the carcass can expand until the corrugations are drawn out of the half sole and the inner walls thereof drawn into contact with the opposed walls of the carcass. At this time, if desired, by the use of a suitable stitching or like roller, these surfaces may be rolled into firm contact with each other so as to obtain the requisite adhesion of the parts.

I claim:

1. A half sole having incorporated therein means for holding portions thereof out of contact with the opposing portions of the periphery of the carcass during the initial application of the half sole.

2. A half sole having an outwardly projecting corrugation extending circumferentially of the side thereof.

3. A tire section having portions of the inner wall thereof offset from the plane of the main portion of said wall.

4. A tire section having an outwardly projecting corrugation extending circumferentially of the opposite sides thereof.

5. A half sole having a zone extending circumferentially thereof of greater expansibility transversely than the remaining portions of the half sole.

6. A half sole having an offset portion extending circumferentially of its side wall for facilitating the expansion of the old carcass after the application of the half sole.

In testimony whereof I affix my signature.

FERDINAND FRANCIS BRUCKER.